UNITED STATES PATENT OFFICE.

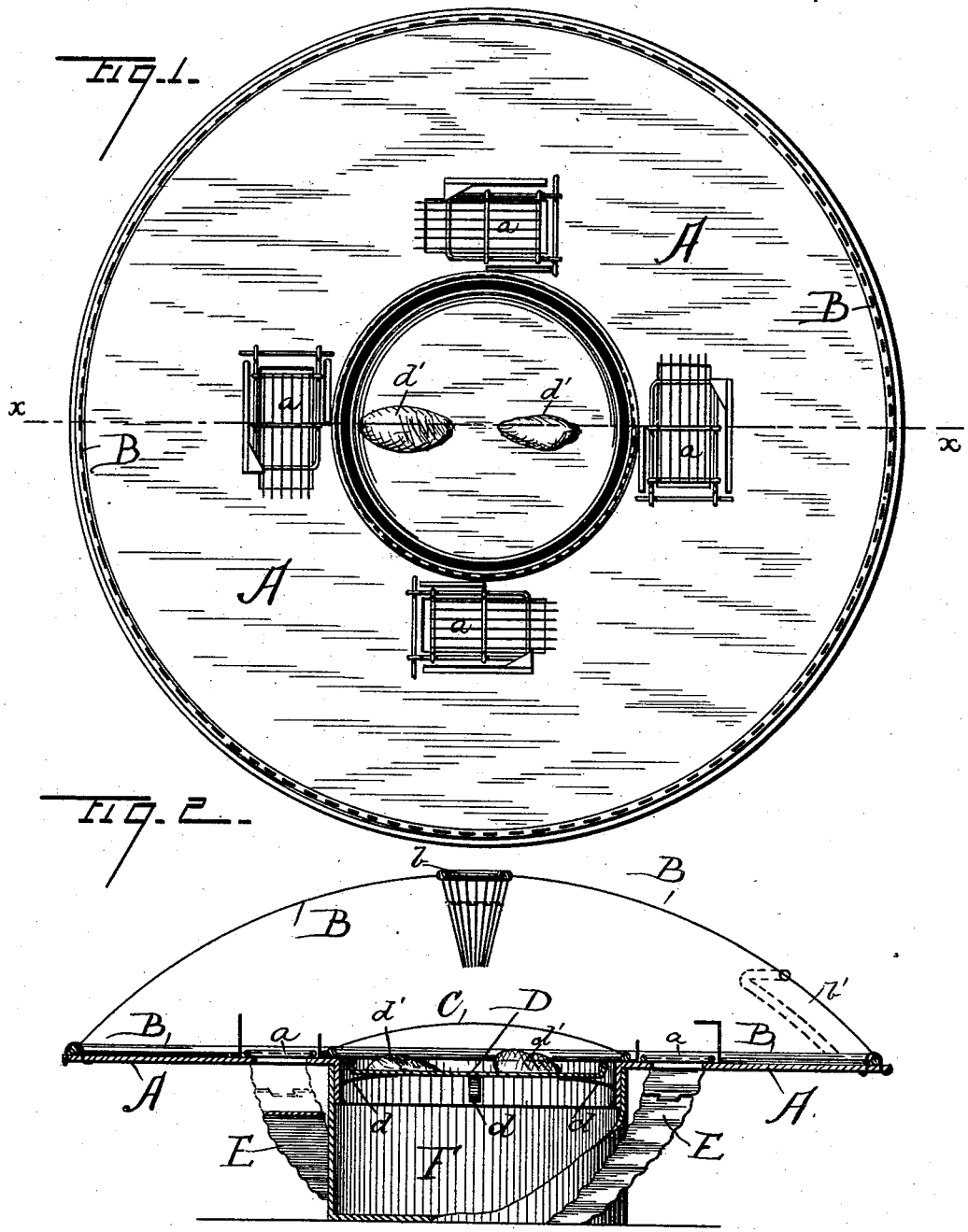

THOMAS DOOLAN, OF CHICAGO, ILLINOIS.

ANIMAL-TRAP.

SPECIFICATION forming part of Letters Patent No. 373,799, dated November 22, 1887.

Application filed March 29, 1887. Serial No. 232,841. (No model.)

*To all whom it may concern:*

Be it known that I, THOMAS DOOLAN, a citizen of the United States, residing at Chicago, in the county of Cook and State of Illinois, have invented a new and useful Improvement in Animal-Traps, of which the following is a specification.

The object of my invention is to make a simple efficient animal-trap, primarily for the catching of rats; and the invention consists in the features and combinations hereinafter described and claimed.

In the accompanying drawings, Figure 1 is a plan view, particularly intended to show the floor of my improved animal-trap; and Fig. 2, a side elevation taken in line $x\ x$ of Fig. 1, with parts cut away.

A is the floor, and $a$ holes or openings therein adapted to be closed by wire doors; B, a wire-netting covering the trap; $b$, an opening therein at the top, and $b'$ an opening therein at one side; C, a wire-netting covering the bait; D, a removable bait-plate; $d$, springs holding the same in place, and $d'$ bait in the plate; E, walks to enable animals to come up and into the trap from the bottom, and F a swill-bucket or other support for the trap.

My improved animal-trap is preferably made round or cone-shaped, a wire-netting being secured to the bottom or floor, which may be covered with tin, zinc, or other suitable material to prevent the wood from being gnawed away. This wire-netting extends up any distance desired, and forms a complete covering for the whole trap, and it of course prevents the escape of rats or any other animals caught therein. It may also be provided with an opening from the top, through which animals attracted by the bait and climbing up over the wire-netting may get into the trap, this opening being preferably provided with downwardly-projecting wires, coming close together at their lower ends to prevent the escape of animals caught in the trap. This wire-netting may also have a door at the side, through which the animals entrapped may be allowed to get out or escape whenever it is desired to empty the trap, this escape being for the purpose of having them killed. I prefer to have them escape into a barrel or tub of water, in which they will be immediately drowned.

The floor or bottom of the trap may be of any size or shape desired; but, as stated above, I prefer to make it round and to have it covered with tin, zinc, or other metal suitable to prevent the animals from gnawing the wood. This bottom is provided with suitable holes or openings to admit the rats or other animals desired to be caught, and these openings may be provided with light wire doors or covers loosely hinged at one end. The animal attracted by the bait, coming in from the bottom, a special walk leading up to each of the openings being provided for this purpose, readily opens the light wire door and passes into the main inclosure. The door then falling back and closing the opening, such animal is at once securely encaged within the wire-netting.

As stated above, suitable walks may be provided, to enable the animal to come up and enter the trap from the bottom. These walks are preferably hinged or loosely secured in such a way that they may fall into or take any angle desired, according to the position or height at which the trap is placed. I prefer to place the trap on an ordinary swill-bucket, the contents of which will themselves serve to attract rats or other animals. This swill-bucket will serve to hold the trap up a sufficient distance, and the swill therein may answer for the bait when so desired.

When the trap is not used in connection with a swill-bucket, or when it is desired to use cheese or other baits to attract the animals, the bait may be placed in a suitable pan or plate, which is preferably inserted from the bottom and secured or held in place by springs. The animals attracted by the cheese or bait in this plate are prevented from getting at the same by another or smaller wire-netting covering it, so that the bait not eaten up may be again used as often as desired.

Setting the trap on a swill-bucket or other vessel the contents of which will serve as a bait to attract the animals, as above suggested, will be found a very desirable way for using the trap around distilleries, slaughter-houses, and other places having slops, the other bait in such case being used or not, as thought best.

The springs or other devices used to secure and hold the bait-plate in place may be constructed in any way desired; but I have found the form of spring shown in the drawings—that is, a flat steel spring formed by suitably bending the metal—a very convenient and efficient device for this purpose. The main object in this respect is to have the bait-plate removable, so that it may be emptied or taken out whenever it is desired to use the trap without it, and again inserted in a simple easy way whenever it is desired to use it; but it is not necessary to be removable in all cases.

I am aware of the Charles R. Capps patent of February 25, 1868; but my invention differs from the construction therein shown in several particulars, and especially in its having a stationary instead of revolving bottom.

I claim—

1. An animal trap comprising a metallic covered stationary bottom having holes or openings for the admission of animals, walks leading up to such holes or openings, loosely-hinged doors to close such holes or openings, and a wire covering to prevent the escape of encaged animals, substantially as described.

2. An animal-trap comprising a metallic covered stationary bottom having holes or openings for the admission of animals, walks leading up to such holes or openings, loosely-hinged wire doors to close such holes or openings, a removable bait pan or plate, and a wire-netting to prevent the escape of the encaged animals, substantially as described.

3. An animal-trap comprising a metallic covered stationary bottom having holes or openings for the admission of animals, walks leading up to such holes or openings, loosely-hinged wire doors to close such holes or openings, a removable bait pan or plate, a wire-netting covering such bait pan or plate, and a wire covering to prevent the escape of the encaged animals, substantially as described.

4. An animal-trap comprising a metallic covered bottom having holes or openings for the admission of animals, walks leading up to such holes or openings, loosely-hinged wire doors to close such holes or openings, and a wire covering provided with an opening at the top for the admission of animals and having downwardly-projecting wires at such opening to prevent their escape, substantially as described.

5. In combination with a swill-bucket, an animal-trap comprising a metallic covered stationary bottom having holes or openings for the admission of animals, walks leading up to such holes or openings, loosely-hinged doors to close such holes or openings, and a wire covering to prevent the escape of encaged animals, substantially as described.

THOMAS DOOLAN.

Witnesses:
EPHRAIM BANNING,
GEORGE C. COOK.